(12) United States Patent
Yamauchi et al.

(10) Patent No.: US 9,867,264 B2
(45) Date of Patent: Jan. 9, 2018

(54) WIRELESS COMMUNICATION DEVICE AND LIGHTING SYSTEM

(71) Applicant: Panasonic Intellectual Property Management Co., Ltd., Osaka (JP)

(72) Inventors: Takashi Yamauchi, Osaka (JP); Tomomi Hashimoto, Kyoto (JP); Atsuo Nanahara, Kyoto (JP); Yasuyuki Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/602,776

(22) Filed: May 23, 2017

(65) Prior Publication Data

US 2017/0347435 A1    Nov. 30, 2017

(30) Foreign Application Priority Data

May 27, 2016 (JP) .................................. 2016-106654

(51) Int. Cl.
| | | |
|---|---|---|
| H05B 37/02 | (2006.01) | |
| H05B 39/04 | (2006.01) | |
| H05B 41/36 | (2006.01) | |
| G08C 23/04 | (2006.01) | |
| H05B 33/08 | (2006.01) | |

(52) U.S. Cl.
CPC ......... *H05B 37/0272* (2013.01); *G08C 23/04* (2013.01); *H05B 33/0845* (2013.01); *G08C 2201/93* (2013.01)

(58) Field of Classification Search
None
See application file for complete search history.

(56) References Cited

U.S. PATENT DOCUMENTS

| | | | | |
|---|---|---|---|---|
| 2011/0285526 A1* | 11/2011 | Tanaka | ............... | H05B 33/0884 340/514 |
| 2016/0374183 A1* | 12/2016 | Chen | .................. | H05B 37/0254 |

FOREIGN PATENT DOCUMENTS

| | | |
|---|---|---|
| JP | 2004-030954 A | 1/2004 |
| JP | 2004-265793 A | 9/2004 |
| JP | 2005-019000 A | 1/2005 |

(Continued)

*Primary Examiner* — Anh Tran
(74) *Attorney, Agent, or Firm* — McDermott Will & Emery LLP (57) ABSTRACT

A wireless communication device includes: a wired communication circuit which receives, through a wired connection, an operation signal for controlling each of luminaires from a management device which controls an operation of each of the luminaires; a radio communication circuit which converts the operation signal received by the wired communication circuit and transmits the converted operation signal to each of the luminaires over a radio wave; an infrared ray receiver which receives an infrared ray signal transmitted from outside; and a controller. When the wired communication circuit receives a signal having a predetermined pattern from the management device, the controller transitions to a state for receiving the infrared ray signal, and, based on the infrared ray signal transmitted from outside, transmits a signal relating to communication setting between the radio communication circuit and each of the luminaires to each of the plurality of luminaires via the radio communication circuit.

6 Claims, 7 Drawing Sheets

(56) References Cited

FOREIGN PATENT DOCUMENTS

| JP | 2008-251278 A | 10/2008 |
|----|---------------|---------|
| JP | 2011-071697 A | 4/2011  |

* cited by examiner

WIRELESS COMMUNICATION DEVICE AND LIGHTING SYSTEM

CROSS REFERENCE TO RELATED APPLICATION

This application claims the benefit of priority of Japanese Patent Application Number 2016-106654 filed on May 27, 2016, the entire content of which is hereby incorporated by reference.

BACKGROUND

1. Technical Field

The present disclosure relates to a wireless communication device which performs radio communication with a plurality of luminaires, and a lighting system including a plurality of such wireless communication devices.

2. Description of the Related Art

Conventionally, a lighting system including a plurality of luminaires and a management device (controller) for controlling turning on of the plurality of luminaires has been known as an example of a lighting system (see PTL 1 (Japanese Unexamined Patent Application Publication No. 2004-265793)). This management device controls turning on of the plurality of luminaires by transmitting a radio signal using a wireless communication device (antenna).

SUMMARY

Immediately after the plurality of luminaires are installed (laid) on a part (such as a ceiling or the like) of a building, communication setting for each of the luminaires and the wireless communication device has normally not yet been performed, and thus, in such a situation, each luminaire cannot be controlled to turn on. For this reason, there is a need to perform such communication setting between each of the luminaires and the wireless communication device immediately after the laying. Conventionally, however, there are cases where such communication setting has required much effort.

In view of this, the present disclosure provides a wireless communication device etc. capable of easily performing communication setting with a plurality of luminaires.

A wireless communication device according to the present disclosure is a wireless communication device which performs radio communication with a plurality of luminaires, and communicates with a management device which controls operations of the plurality of luminaires, the wireless communication device including: a wired communication circuit which receives, through a wired connection, an operation signal for controlling the plurality of luminaires from the management device; a radio communication circuit which converts the operation signal received by the wired communication circuit and transmits the converted operation signal to the plurality of luminaires over a radio wave; an infrared ray receiver which receives an infrared ray signal transmitted from outside; and a controller which controls the wired communication circuit, the radio communication circuit, and the infrared ray receiver, wherein when the wired communication circuit receives a signal having a predetermined pattern from the management device, the controller transitions to a state for receiving the infrared ray signal, and, based on the infrared ray signal, transmits a signal relating to communication setting between the radio communication circuit and the plurality of luminaires to the plurality of luminaires via the radio communication circuit.

In addition, a lighting system according to a present disclosure is a lighting system including: a plurality of luminaires; a management device which controls operations of the plurality of luminaires; a plurality of wireless communication circuits which transmit an operation signal for controlling the plurality of luminaires transmitted from the management device to the plurality of luminaires by performing radio communication; and a remote controller which transmits an infrared signal to the plurality of wireless communication circuits, wherein each of the plurality of wireless communication circuits includes: a wired communication circuit which receives, through a wired connection, the operation signal from the management device; a radio communication circuit which converts the operation signal received by the wired communication circuit and transmits the converted operation signal to the plurality of luminaires over a radio wave; an infrared ray receiver which receives the infrared ray signal transmitted from the remote controller; and a controller which controls the wired communication circuit, the radio communication circuit, and the infrared ray receiver, and wherein when the wired communication circuit receives a signal having a predetermined pattern from the management device, the controller of each of the plurality of wireless communication circuits transitions to a state for receiving the infrared ray signal of the remote controller, and, based on the infrared ray signal transmitted from the remote controller, transmits a signal relating to communication setting between the radio communication circuit and the plurality of luminaires to the plurality of luminaires via the radio communication circuit.

The wireless communication device according to the present disclosure is capable of easily performing the communication setting with the luminaires.

In addition, the lighting system according to the present disclosure is capable of easily performing the communication setting between the plurality of luminaires and a plurality of such wireless communication devices.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, wireless communication devices and a lighting system according to an embodiment are described with reference to the drawings. It is to be noted that each of the exemplary embodiment described below shows a specific example of the present disclosure. Accordingly, the numerical values, shapes, materials, constituent elements, the arrangement and connection of the constituent elements, etc. shown in the following exemplary embodiment are mere examples, and therefore do not limit the present disclosure. Therefore, among the constituent elements in the following exemplary embodiment, constituent elements not recited in any one of the independent claims that define the most generic concept of the present disclosure are described as arbitrary constituent elements.

It is to be noted that each of the drawings is a schematic diagram, and thus is not always illustrated precisely. In addition, in each of the diagram, substantially the same constituent elements are assigned with the same reference numerals, and overlapping descriptions are omitted or simplified.

EMBODIMENT

[The Overall Configuration etc. of the Lighting System]

Figure 1:
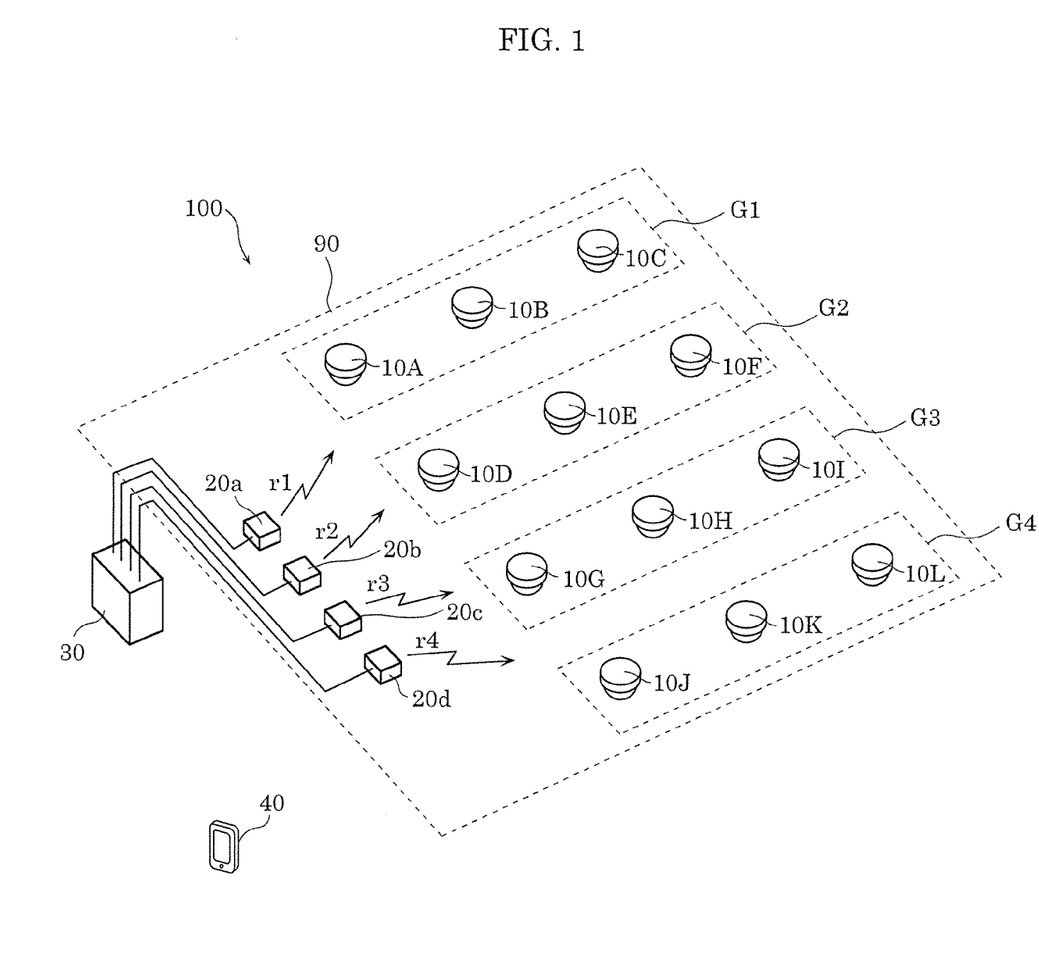
FIG. 1 is a schematic diagram illustrating a lighting system according to an embodiment.

The overall configuration of the lighting system according to the embodiment is described first. FIG. 1 is a schematic diagram illustrating lighting system 100 according to the embodiment.

Lighting system 100 includes: a plurality of luminaires 10A, 10B, 10C, 10D, 10E, 10F, 10G, 10H, 10I, 10J, 10K, and 10L; a plurality of wireless communication devices 20a to 20d which perform radio communication with luminaires 10A to 10L; and management device 30 which controls operations of luminaires 10A to 10L. In addition, lighting system 100 includes remote controller 40.

Management device 30 is connected to wireless communication devices 20a to 20d through a wired connection. Management device 30 transmits radio signals r1, r2, r3, and r4 using wireless communication devices 20a to 20d, and controls turning on of luminaires 10A to 10L.

More specifically, wireless communication device 20a has been subjected to communication setting for transmitting radio signal r1 to luminaires 10A to 10C which belong to group G1. Wireless communication device 20b has been subjected to communication setting for transmitting radio signal r2 to luminaires 10D to 10F which belong to group G2. Wireless communication device 20c has been subjected to communication setting for transmitting radio signal r3 to luminaires 10G to 10I which belong to group G3. Wireless communication device 20d has been subjected to communication setting for transmitting radio signal r4 to luminaires 10J to 10L which belong to group G4. As a communication method for transmitting radio signals r1 to r4, specified low power radio using a frequency band of 920 MHz or 2.4 GHz, or a method such as WiFi (registered trademark) is used.

In addition, each of wireless communication devices 20a to 20d includes infrared ray receiver 22 (see FIG. 3), and is configured to receive infrared ray signal i1 transmitted from remote controller 40.

In FIG. 1, twelve luminaires 10A to 10L are illustrated as examples. However, in reality, fifty or more luminaires may be installed on ceiling 90 of a building such as a gymnasium or a shop.

In order to control turning on of luminaires 10A to 10L, communication setting for luminaires 10A to 10L needs to be established in lighting system 100. In this embodiment, after wireless communication devices 20a to 20d and luminaires 10A to 10L are installed (laid) on ceiling 90 of the building, communication setting between wireless communication devices 20a to 20d and luminaires 10A to 10L is performed using remote controller 40.

Figure 2:
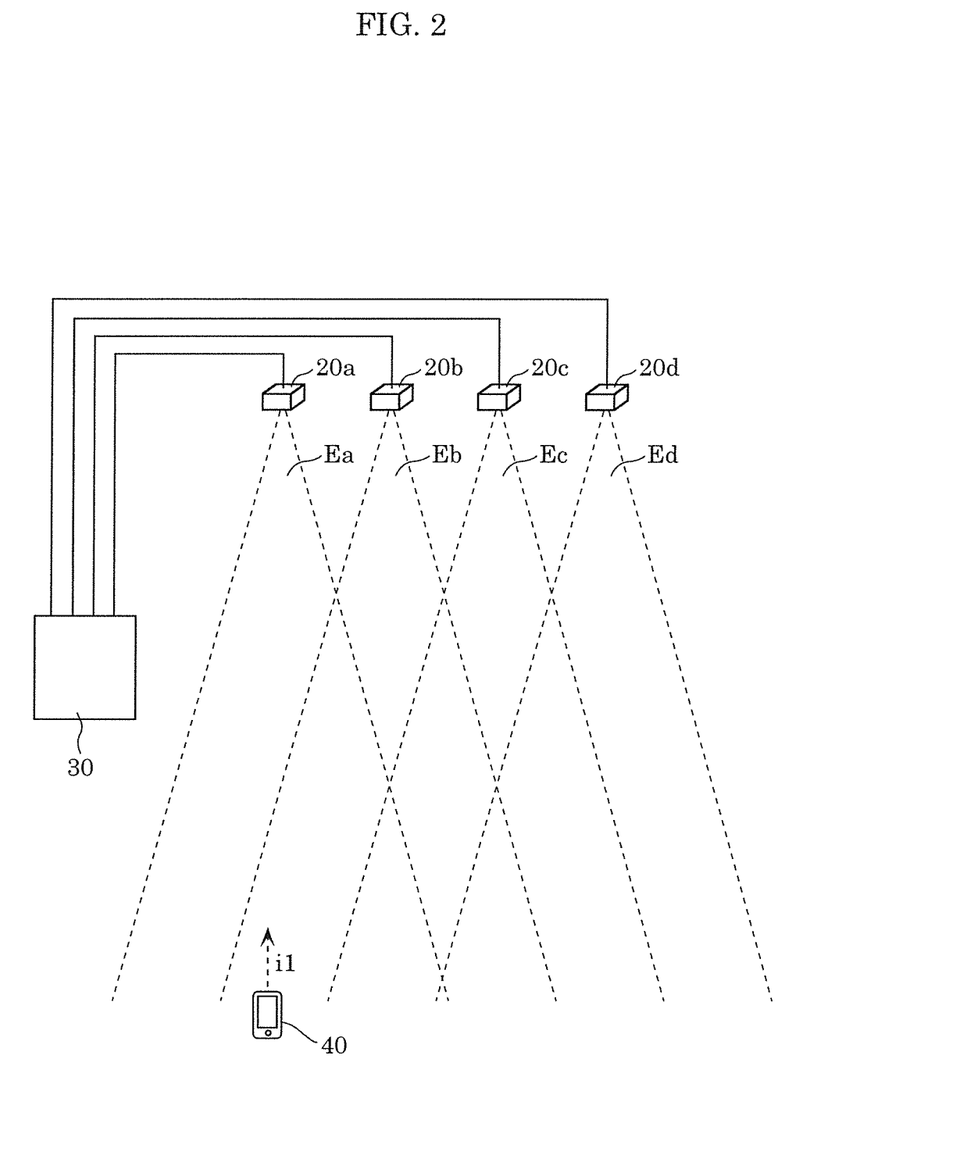
FIG. 2 is a diagram illustrating a relationship between wireless communication devices and a remote controller which are used in the lighting system according to the embodiment.

FIG. 2 is a diagram illustrating a relationship between wireless communication devices 20a to 20d and remote controller 40 which are used in lighting system 100.

Wireless communication devices 20a to 20d are installed on ceiling 90 in the same manner as luminaires 10A to 10L. Wireless communication devices 20a to 20d are installed adjacent to each other at small intervals in order to reduce the number of wiring processes in the laying. Specifically, the intervals between wireless communication devices 20a to 20d are smaller than the intervals between luminaires 10A to 10L.

Infrared ray receivers 22 included in respective wireless communication devices 20a to 20d are, for example, infrared ray sensors and their infrared ray reception areas Ea, Eb, Ec, and Ed become wider with increase in the distances from infrared ray receivers 22 themselves. For this reason, for example, when infrared ray signal i1 of remote controller 40 is transmitted toward wireless communication device 20a, there is a problem that wireless communication device 20b located adjacent receives infrared ray signal i1, and thus that it is impossible to perform an appropriate communication setting for wireless communication device 20a. In particular, when wireless communication devices 20a to 20d are installed on high ceiling 90 of a building such as a gymnasium, the aforementioned problem becomes more noticeable.

In this embodiment, by means of lighting system 100 having the configuration indicated below, it is possible to easily perform communication setting in lighting system 100, that is, communication setting between wireless communication devices 20a to 20d and luminaires 10A to 10L.

Hereinafter, wireless communication devices 20a to 20d, luminaires 10A to 10L, management device 30, and remote controller 40 included in lighting system 100 are described in order.

[Wireless Communication Devices]

Figure 3:
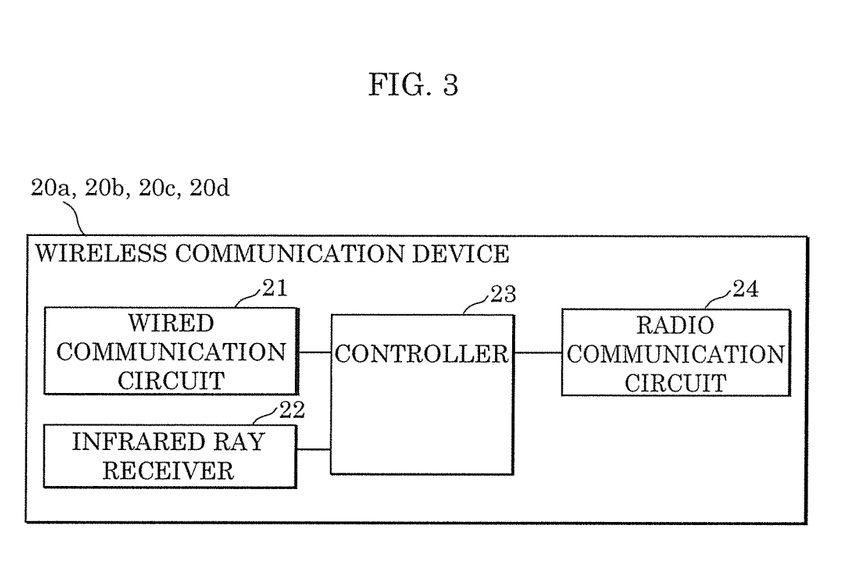
FIG. 3 is a block diagram illustrating a control configuration of each of wireless communication devices according to the embodiment.

FIG. 3 is a block diagram illustrating a control configuration of wireless communication devices 20a to 20d.

Each of wireless communication devices 20a to 20d includes wired communication circuit 21, radio communication circuit 24, infrared ray receiver 22, and controller 23 Wired communication circuit 21 receives an operation signal for controlling some of luminaires 10A to 10L transmitted from management device 30. Radio communication circuit 24 converts the operation signal received by wired communication circuit 21 and transmits the converted operation signal to the plurality of luminaires 10A to 10L over a radio wave. Infrared ray receiver 22 receives infrared ray signal i1 transmitted from remote controller 40.

Controller 23 is configured with a central processing unit (CPU), and a random access memory (RAM), a read only memory (ROM), or the like. Controller 23 controls wired communication circuit 21, radio communication circuit 24, and infrared ray receiver 22 not only when luminaires 10A to 10L are controlled to turn on but also when communication setting is performed after the laying.

The plurality of wireless communication devices 20a to 20d are each in a state for ignoring infrared ray signal i1 from remote controller 40 when the plurality of wireless communication devices 20a to 20d have not received a signal having a predetermined pattern. When communication setting is performed for one wireless communication device included in the plurality of wireless communication devices 20a to 20d, the signal having the predetermined pattern is transmitted from management device 30 to the one wireless communication device. Upon receiving the signal having the predetermined pattern, the one wireless communication device transitions to a state for receiving infrared ray signal i1 from remote controller 40. For example, when wireless communication device 20a has received the signal having the predetermined pattern, only wireless communication device 20a transitions to a state for receiving a command of infrared ray signal i1. On the other hand, the other wireless communication devices 20b to 20d which have not received the signal having the predetermined pattern remain in a state for ignoring infrared ray signal i1. By means of the signal having the predetermined pattern being transmitted from management device 30 to the one wireless communication device in this way, as illustrated in FIG. 2, it is possible to perform the communication setting for the one wireless communication device even when infrared ray reception areas Ea to Ed of wireless communication devices 20a to 20d overlap with each other.

For example, wireless communication device 20a which can now receive infrared ray signal i1 transmits a signal relating to communication setting between radio communication circuit 24 and luminaires 10A to 10L to luminaires 10A to 10L via radio communication circuit 24, based on an initial setting command of infrared ray signal i1 of remote controller 40. At this time, wireless communication device 20a broadcasts radio signal r1 which carries a unique shared code stored therein. Luminaires (for example, luminaires 10A to 10C) subjected to a predetermined operation, receive the shared code, and, after the reception, are to be controlled to be operated via radio signal r1 of wireless communication device 20a. The predetermined operation is described later.

[Luminaires]

Luminaires 10A to 10L are, for example, LED lights. In this embodiment, as illustrated in FIG. 1, luminaires 10A to 10L are arranged in a matrix. It is to be noted that luminaires 10A to 10L are not limited to LED lights, and may be ceiling lights.

Figure 4:
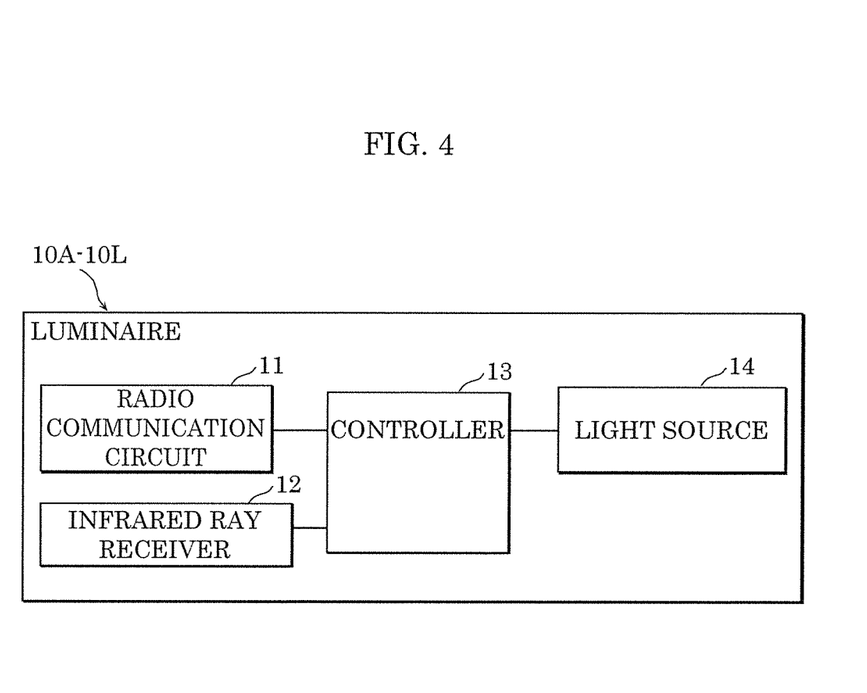
FIG. 4 is a block diagram illustrating a control configuration of each of luminaires for use in the lighting system according to the embodiment.

FIG. 4 is a block diagram illustrating a control configuration of luminaires 10A to 10L. Each of luminaires 10A to 10L includes radio communication circuit 11, light source 14, infrared ray receiver 12, and controller 13.

Radio communication circuit 11 receives an operation signal transmitted from management device 30 via wireless communication devices 20a to 20d. Light source 14 includes, for example, a plurality of light emitting diodes each of which emits white light, red light, green light, or blue light. Light source 14 is subjected to dimming control and/or color adjustment control, based on the operation signal received by radio communication circuit 11. Infrared ray receiver 12 receives infrared ray signal i1 transmitted from remote controller 40.

Controller 13 is configured with a CPU, and a RAM, a ROM, or the like. Controller 13 controls radio communication circuit 11 and infrared ray receiver 12 not only when light source 14 is controlled to turn on but also when communication setting is performed after laying the luminaires.

When communication setting for luminaires 10A to 10L is performed, signals relating to the communication setting are transmitted from wireless communication devices 20a to 20d to luminaires 10A to 10L. The signals relating to the communication setting are signals for setting shared codes to luminaires 10A to 10L, so that the plurality of luminaires 10A to 10L are operated via radio signals r1 to r4.

For example, a unique shared code stored in wireless communication device 20a is transmitted from wireless communication device 20a to luminaires 10A to 10L via radio signal r1. Subsequently, the some of luminaires 10A to 10L (for example, luminaires 10A to 10C) subjected to a predetermined operation receive the signal relating to the communication setting, and takes the transmitted shared code. Here, the predetermined operation is, for example, an operation for re-activating luminaires 10A to 10C. Luminaires 10A to 10C receive the signal relating to the communication setting by means of being re-activated. In this way, setting based on the communication setting is performed for luminaires 10A to 10C, and the communication setting between luminaires 10A to 10C and wireless communication device 20a is completed.

Likewise, communication setting between remaining luminaires 10D to 10L and wireless communication devices 20b to 20d is performed to complete the communication setting in overall lighting system 100.

It is to be noted that luminaires 10A to 10L may be re-activated by means of receiving a re-activation command of infrared ray signal i1 from remote controller 40. In addition, when power source switches of luminaires 10A to 10L is provided on a ceiling or the like of a building, luminaires 10A to 10L may be re-activated by means of the power source switches being switched between ON and OFF.

[Management Device]

Figure 5:
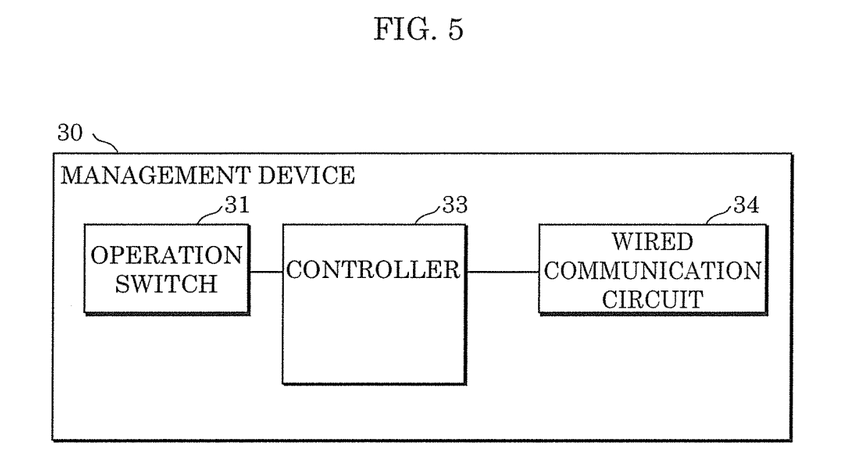
FIG. 5 is a block diagram illustrating a control configuration of the management device for use in the lighting system according to the embodiment.

Management device 30 is a management server for controlling operations by luminaires 10A to 10L.

FIG. 5 is a block diagram illustrating a control configuration of management device 30. Management device 30 includes controller 33, wired communication circuit 34, and operation switch 31.

Controller 33 and wired communication circuit 34 are included in the device body. Operation switch 31 is installed outside the device body and, for example, on a ceiling which is easily reached by a user in a building. In addition, a plurality of operation switches 31 are provided correspondingly to respective wireless communication devices 20a to 20d. Wired communication circuit 34 is connected to wireless communication devices 20a to 20d through a wired connection.

Controller 33 is configured with a CPU, and a RAM, a ROM, or the like. Controller 33 controls wired communication circuit 34 not only when controlling operations performed by luminaires 10A to 10L but also performing communication setting in the laying.

When performing the communication setting, for example by means of operation switch 31 corresponding to wireless communication device 20a being turned ON, management device 30 transmits a signal having a predetermined pattern to wireless communication device 20a. This operation creates a state in which infrared ray signal i1 from remote controller 40 can be received in wireless communication device 20a. Triggered by the operation like this, communication setting between wireless communication device 20a and luminaires 10A to 10C described above is performed.

It is to be noted that the signal having predetermined pattern is a signal having a preset pattern different from that of a dimming control signal for dimming luminaires 10A to 10L. This dimming control signal is a pulse width modulation (PWM) signal having a particular duty. In comparison, a signal which has a predetermined pattern and is used when communication setting is performed has a duty different from the particular duty. The signal having the predetermined pattern may be, for example, a signal which remains at a High level for one minute, a signal having a pattern in which a High/Low pulse width is predetermined, or a signal which alternately remains at a Hi level and exhibits a pattern in which a High/Low pulse width is predetermined.

[Remote Controller]

Figure 6:
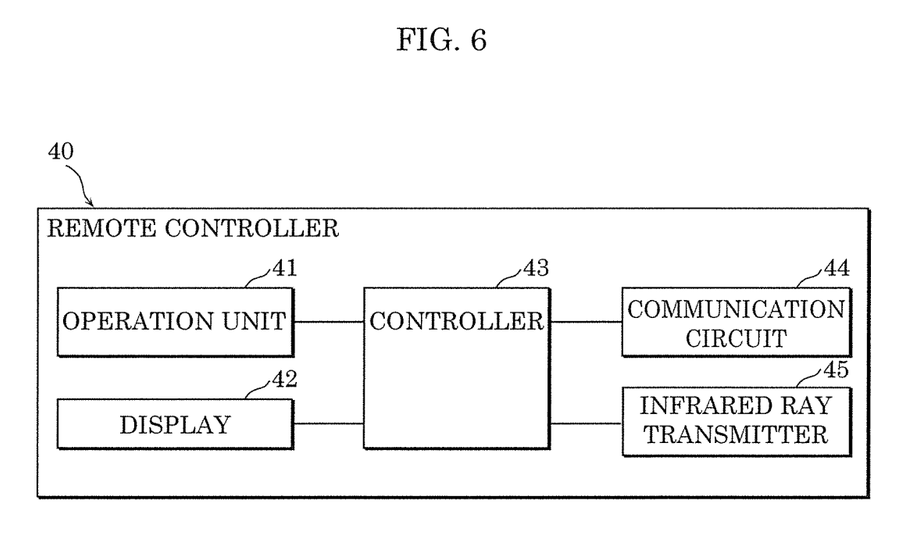
FIG. 6 is a block diagram illustrating a control configuration of the remote controller for use in the lighting system according to the embodiment.

Remote controller 40 is, for example, a tablet terminal, or a smartphone. Remote controller 40 in this embodiment is used as a setter for performing communication setting.

FIG. 6 is a block diagram illustrating a control configuration of remote controller 40. Remote controller 40 includes controller 43, infrared ray transmitter 45, display 42, operation unit 41, and communication circuit 44.

Controller 43 is configured with a CPU, and a RAM, a ROM, or the like, and controls display 42, operation unit 41, infrared ray transmitter 45, and communication circuit 44. Controller 43 reads out command information when communication setting is performed.

Infrared ray transmitter 45 is, for example, a transmitter such as an infrared ray LED, and transmits a command relating to communication setting to wireless communication devices 20a to 20d using infrared ray signal i1. The communication by this infrared ray signal i1 is a one-way communication from remote controller 40 to wireless communication devices 20a to 20d. In this embodiment, communication is performed using infrared ray transmitter 45 included in remote controller 40. However, communication is not limited thereto. Also in a case in which communication is performed using an infrared ray transmitter provided externally and connected to remote controller 40, infrared ray signal i1 is transmitted substantially using remote controller 40.

Operation unit 41 is, for example, a touch panel which is also used as display 42. By means of operation unit 41 being operated, infrared ray signal is transmitted to wireless communication devices 20a to 20d.

[Communication Setting Method]

Next, a specific method for performing communication setting in lighting system 100 is described.

Figure 7:
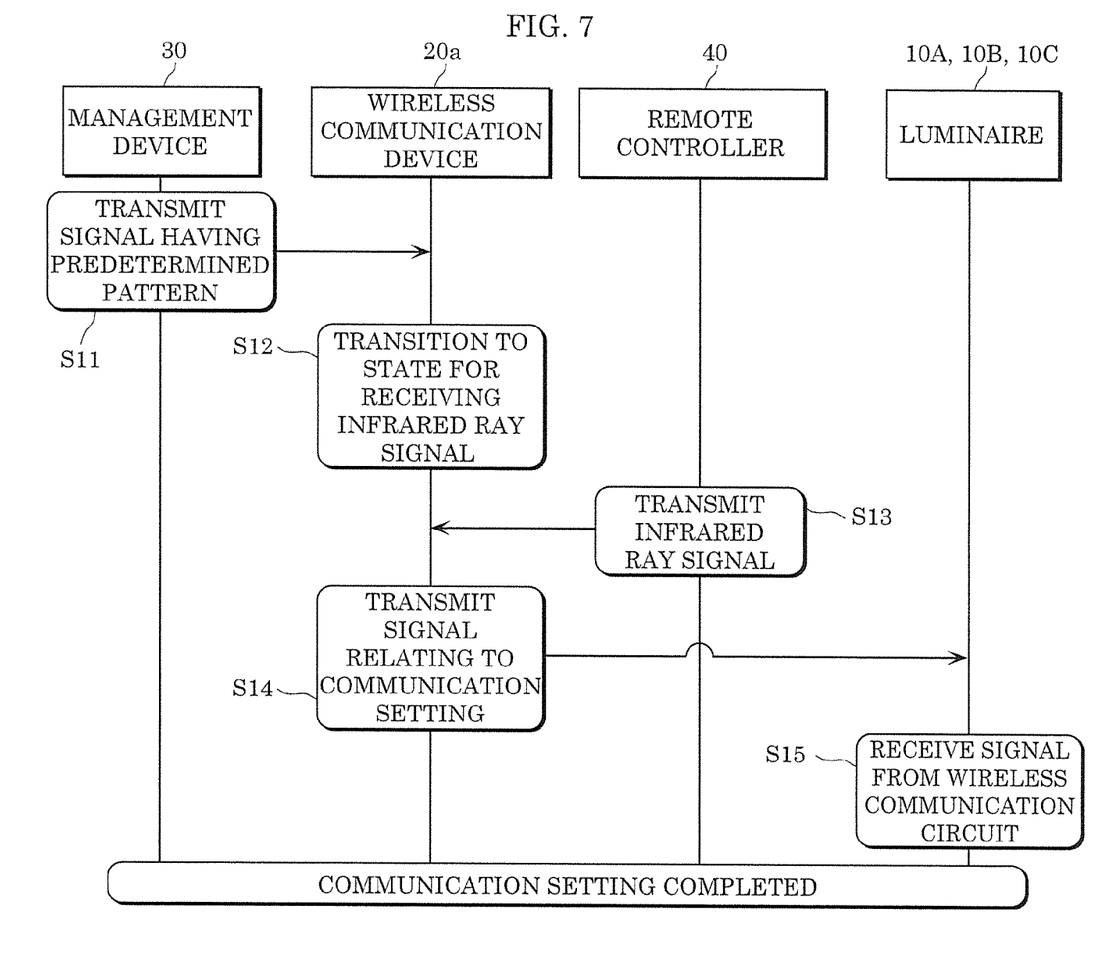
FIG. 7 is a diagram illustrating a flow for performing communication setting in the lighting system according to the embodiment.
Figure 8:
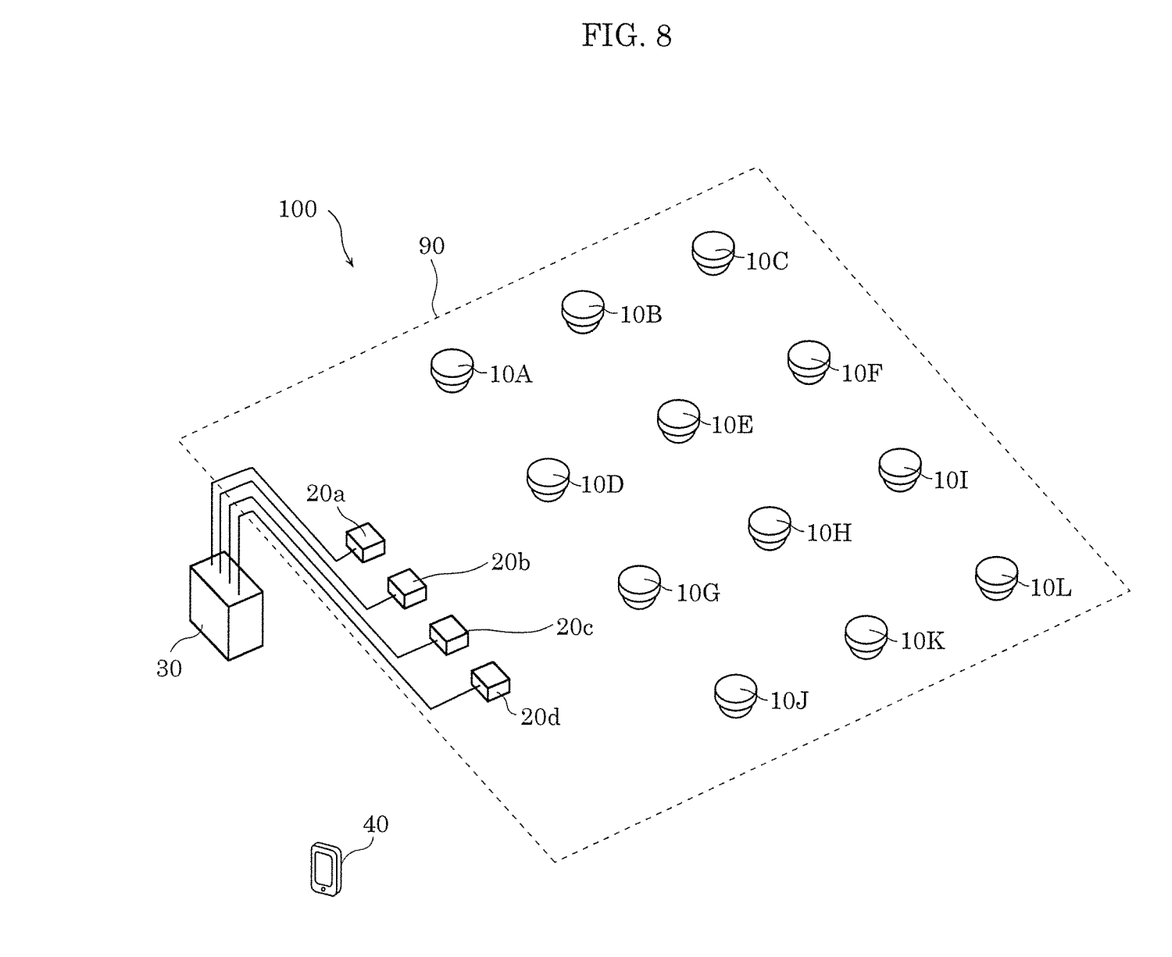
FIG. 8 is a schematic diagram illustrating a state of the lighting system in a state before the communication setting is performed.
Figure 9:
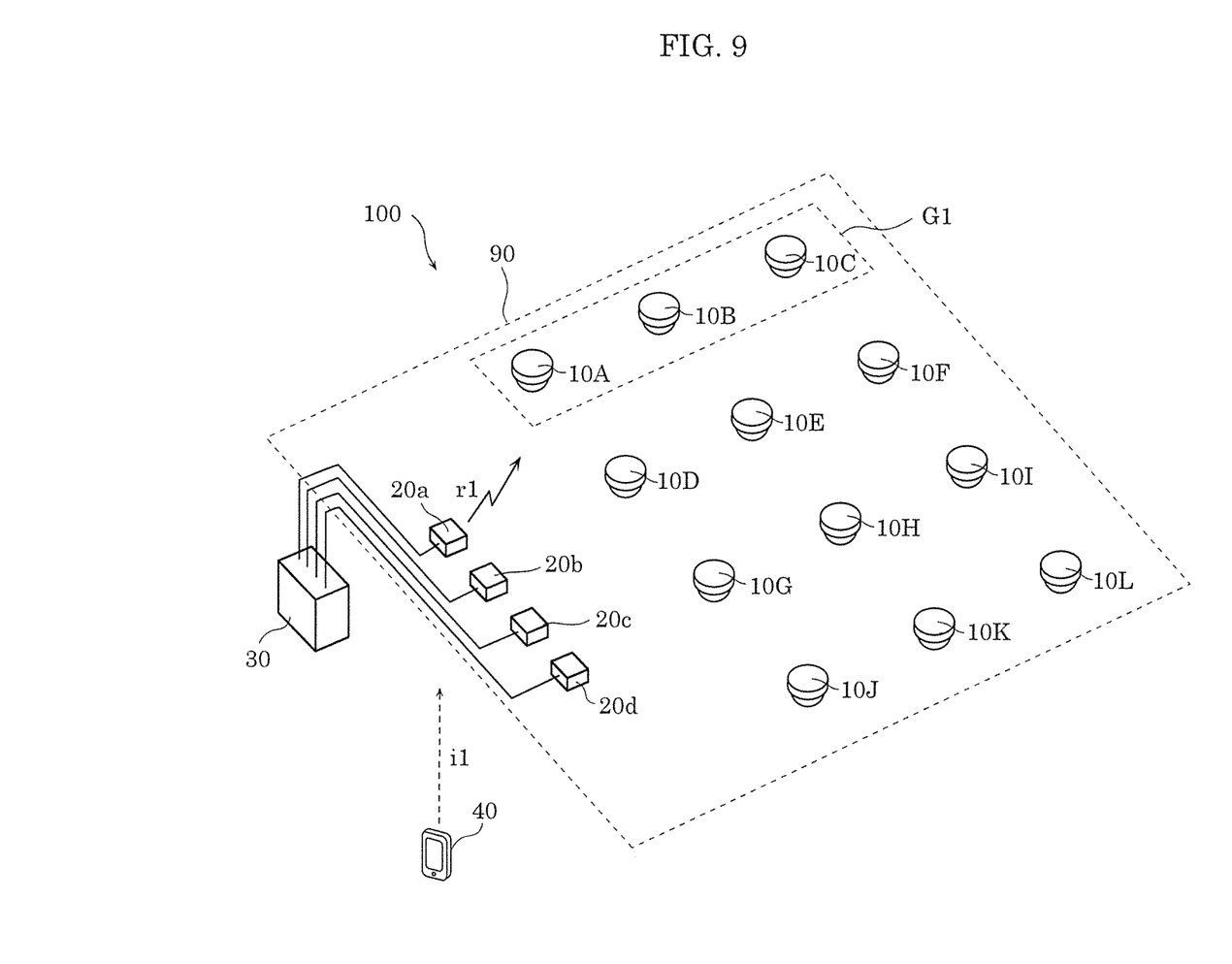
FIG. 9 is a schematic diagram illustrating a state of the lighting system in a state in which communication setting is being performed.

FIG. 7 is a diagram illustrating a flow in the case where communication setting is performed in lighting system 100. FIG. 8 is a schematic diagram illustrating a state of lighting system 100 in a state before communication setting is performed. FIG. 9 is a schematic diagram illustrating a state of lighting system 100 while communication setting is being performed.

Immediately after the laying in which luminaires 10A to 10L and wireless communication devices 20a to 20d are installed, as illustrated in FIG. 8, luminaires 10A to 10L and wireless communication devices 20a to 20d have not yet been associated with each other, and luminaires 10A to 10L have not yet been classified under groups. As such, communication setting is performed between wireless communication devices 20a to 20d and luminaires 10A to 10L so that wireless communication devices 20a to 20d and luminaires 10A to 10L are associated with each other.

Here, with reference to FIG. 7, a description is given of a case in which communication setting between wireless communication device 20a and luminaires 10A to 10C is performed as a part of the communication setting for overall lighting system 100.

First, a signal having a predetermined pattern is transmitted from management device 30 to wireless communication device 20a which performs the communication setting (S11). This signal having the predetermined pattern is transmitted to wireless communication device 20a by means of a user turning ON operation switch 31 which is of management device 30 and corresponds to wireless communication device 20a. A time period during which the signal having the predetermined pattern is output is, for example, approximately one minute, and the communication setting needs to be performed in the time period. The signal having the predetermined pattern is a signal having a preset pattern different from that of the dimming signal.

Upon receiving the signal having the predetermined pattern, wireless communication device 20a transitions to a state (an operated state) for receiving infrared ray signal i1 (S12). More specifically, wireless communication device 20a transitions to a state for receiving an initial setting command of infrared ray signal i1 of remote controller 40.

Next, infrared ray signal i1 is transmitted from remote controller 40 to wireless communication device 20a (S13). Infrared ray signal i1 is transmitted by means of the user touching operation unit 41 of remote controller 40. It is to be noted that wireless communication devices 20b to 20d other than wireless communication device 20a are not in a state for receiving a command of infrared ray signal i1, and thus no problem arises even when infrared ray signal i1 from remote controller 40 is temporarily deviated and transmitted toward wireless communication devices 20b to 20d.

Upon receiving infrared ray signal i1, wireless communication device 20a transmits a signal relating to the communication setting between radio communication circuit 24 and luminaires 10A to 10C to luminaires 10A to 10C via radio communication circuit 24, based on the initial setting command of infrared ray signal i1 (S14). The signal relating to the communication setting is a signal for setting a shared code to luminaires 10A to 10C, so that luminaires 10A to 10C are operated based on radio signal r1 of wireless communication device 20a. It is to be noted that radio signal r1 including the signal relating to this communication setting is also transmitted toward the other luminaires 10D to 10L at the same time.

Next, as for luminaires 10A to 10C to which the signal relating to the communication setting was transmitted from wireless communication device 20a, an operation for receiving the signal relating to the communication setting is performed (S15). More specifically, luminaires 10A to 10C are turned ON/OFF, and are re-activated. In this way, in luminaires 10A to 10C, the signal relating to the communication setting is received, and thus the shared code from wireless communication device 20a is taken. According to these steps, the communication setting between wireless communication device 20a and luminaires 10A to 10C is completed.

With this communication setting, operations by luminaires 10A to 10C are controlled following radio signal r1 including the shared code of wireless communication device 20a (see FIG. 9). On the other hand, luminaires 10D to 10L do not follow radio signal r1 including the shared code of wireless communication device 20a and ignore radio signal r1.

The flow indicated in FIG. 7 is performed in the same manner for wireless communication devices 20b to 20d and luminaires 10D to 10L to complete the communication setting for overall lighting system 100.

The case in which the initial communication setting is performed immediately after the laying has been described above, but it is to be noted that communication setting is not limited thereto. For example, as communication setting, a communication frequency for communication between wireless communication device 20a and luminaires 10A to 10C may be changed. Even when the communication frequency is changed, it is only necessary that the same operations as in the above-described communication setting be performed. More specifically, when a signal having a predetermined pattern from management device 30 is received by wired communication circuit 21, controller 23 of wireless communication device 20a transitions to a state for receiving a command which changes the communication frequency of infrared ray signal i1 of remote controller 40, and transmits the signal relating to the communication setting between radio communication circuit 24 and luminaires 10A to 10C to luminaires 10A to 10C via radio communication circuit 24, based on infrared ray signal i1 transmitted from remote controller 40. Subsequently, when luminaires 10A to 10C are re-activated in the same manner, the setting of the communication frequency is changed.

It is to be noted that when the communication frequency is changed for each of groups G1 to G4, there is no need to re-activate luminaires 10A to 10L one by one. For example, it is possible to collectively change the communication frequencies of luminaires 10A to 10C which belong to group G1 using wireless communication device 20a.

[Effects]

Wireless communication device 20a according to the embodiment is wireless communication device 20a which performs radio communication with a plurality of luminaires 10A to 10C, and communicates with management device 30 which controls operations of the plurality of luminaires 10A to 10C, wireless communication device 20a including: wired communication circuit 21 which receives, through a wired connection, an operation signal for controlling the plurality of luminaires 10A to 10C from management device 30; radio communication circuit 24 which converts the operation signal received by wired communication circuit 21 and transmits the converted operation signal to the plurality of luminaires 10A to 10C over a radio wave; infrared ray receiver 22 which receives infrared ray signal i1 transmitted from outside (for example, remote controller 40); and controller 23 which controls wired communication circuit 21, radio communication circuit 24, and infrared ray receiver 22, wherein when wired communication circuit 21 receives a signal having a predetermined pattern from management device 30, controller 23 transitions to a state for receiving infrared ray signal i1, and, based on infrared ray signal i1 transmitted from outside, transmits a signal relating to communication setting between radio communication circuit 24 and the plurality of luminaires 10A to 10C to the plurality of luminaires 10A to 10C via radio communication circuit 24.

With this configuration, for example, it is possible to easily perform communication setting between wireless communication device 20a and luminaires 10A to 10C. In addition, it is possible to easily perform the communication setting between wireless communication device 20a and luminaires 10A to 10C without storing, in management device 30, the unique addresses of luminaires 10A to 10C or positional coordinates of luminaires 10A to 10C. In addition, since infrared ray signal i1 can be received when the signal having the predetermined pattern is received by wired communication circuit 21, even when wireless communication devices 20a to 20d are arranged side by side at small intervals, it is possible to appropriately perform communication setting by enabling a predetermined wireless communication device (for example, wireless communication device 20a) to receive infrared ray signal i1 while preventing a wireless communication device (for example, wireless communication device 20b) located adjacent from receiving infrared ray signal i1.

In addition, the signal relating to the communication setting may be a signal for setting a shared code to the plurality of luminaires 10A to 10C, so that the plurality of luminaires 10A to 10C are operated based on radio signal r1.

With this configuration, for example, it is possible to easily perform communication setting between wireless communication device 20a and luminaires 10A to 10C after the laying. In addition, after the communication setting is performed, it is possible to perform control for turning on luminaires 10A to 10C by way of the simple radio signal using the shared code.

In addition, the signal relating to the communication setting may be a signal for setting a communication frequency for communication between radio communication circuit 24 and the plurality of luminaires 10A to 10C.

With this configuration, for example, it is possible to easily change the communication frequency between wireless communication device 20a and luminaires 10A to 10C.

In addition, the operation signal may be a dimming control signal for dimming the plurality of luminaires 10A to 10C, and the signal having the predetermined pattern may be a signal having a preset pattern different from the pattern of the dimming control signal.

With this configuration, wireless communication device 20a can reliably receive infrared ray signal i1.

In addition, lighting system 100 according to the embodiment is lighting system 100 including: a plurality of luminaires 10A to 10L; management device 30 which controls operations of the plurality of luminaires 10A to 10L; a plurality of wireless communication circuits 20a to 20d which transmit an operation signal for controlling the plurality of luminaires 10A to 10L transmitted from management device 30 to the plurality of luminaires 10A to 10L by performing radio communication; and remote controller 40 which transmits infrared signal i1 to the plurality of wireless communication circuits 20a to 20d, wherein each of the plurality of wireless communication circuits 20a to 20d includes: wired communication circuit 21 which receives, through a wired connection, the operation signal from management device 30; radio communication circuit 24 which converts the operation signal received by wired communication circuit 21 and transmits the converted operation signal to the plurality of luminaires 10A to 10L over a radio wave; infrared ray receiver 22 which receives infrared ray signal i1 transmitted from remote controller 40; and controller 23 which controls wired communication circuit 21, radio communication circuit 24, and infrared ray receiver 22, and wherein when wired communication circuit 21 receives a signal having a predetermined pattern from management device 30, controller 23 of each of the plurality of wireless communication circuits 20a to 20d transitions to a state for receiving infrared ray signal i1 of remote controller 40, and, based on infrared ray signal i1 transmitted from remote controller 40, transmits a signal relating to communication setting between radio communication circuit 24 and the plurality of luminaires 10A to 10L to the plurality of luminaires 10A to 10L via radio communication circuit 24.

With this configuration, for example, it is possible to easily perform communication setting between the plurality of wireless communication devices 20a to 20d and the plurality of luminaires 10A to 10L. For example, it is possible to perform communication setting between wireless communication devices 20a to 20d and luminaires 10A to 10L without storing, in management device 30, the unique addresses of luminaires 10A to 10L or positional coordinates of luminaires 10A to 10L.

In addition, since infrared ray signal i1 of remote controller 40 can be received when the signal having the predetermined pattern is received by wired communication circuit 21, even when wireless communication devices 20a to 20d are arranged side by side at small intervals, it is possible to appropriately perform communication setting by enabling a predetermined wireless communication device (for example, wireless communication device 20a) to receive infrared ray signal i1 while preventing a wireless communication device located adjacent (for example, wireless communication device 20b) from receiving infrared ray signal i1.

In addition, a luminaire included in the plurality of luminaires 10A to 10L and subjected to a predetermined operation may receive a signal relating to the communication setting, and may be set based on the communication setting.

With this configuration, it is possible to reliably perform the communication setting for the luminaire intended by the user among the plurality of luminaires 10A to 10L.

OTHER EMBODIMENTS

Although wireless communication devices 20a to 20d and lighting system 100 have been described above based on the embodiment, the present disclosure is not limited to the above embodiment. For example, the present disclosure includes embodiments which can be obtained by adding various kinds of modifications that a person skilled in the art may arrive at to the above embodiment, or embodiments which can be implemented by arbitrarily combining the constituent elements and functions in the embodiment without deviating from the scope of the present disclosure.

For example, it is also good to allow wireless communication between radio communication circuit 24 of each of luminaires 10A to 10L and communication circuit 44 of controller 40, and when an inquiry relating to the communication setting is performed by remote controller 40, to display, on display 42 of remote controller 40, whether the communication setting for luminaires 10A to 10L has been performed appropriately. For example, when the signal for inquiring the communication setting is transmitted from remote controller 40 to luminaire 10A via infrared ray signal i1, luminaire 10A may transmit information indicating the state of luminaire 10A itself which has been set to specify from which wireless communication device luminaire 10A can receive the radio signal, information indicating which channel is used as the communication frequency, or other information.

In addition, each of groups G1 to G4 of luminaires 10A to 10L may form a mesh network, and transmit a radio signal via the mesh network.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A wireless communication device which performs radio communication with a plurality of luminaires, and communicates with a management device which controls operations of the plurality of luminaires, the wireless communication device comprising:
   a wired communication circuit which receives, through a wired connection, an operation signal for controlling the plurality of luminaires from the management device;
   a radio communication circuit which converts the operation signal received by the wired communication circuit and transmits the converted operation signal to the plurality of luminaires over a radio wave;
   an infrared ray receiver which receives an infrared ray signal transmitted from outside; and
   a controller which controls the wired communication circuit, the radio communication circuit, and the infrared ray receiver,
   wherein when the wired communication circuit receives a signal having a predetermined pattern from the management device, the controller transitions to a state for receiving the infrared ray signal, and, based on the infrared ray signal, transmits a signal relating to communication setting between the radio communication circuit and the plurality of luminaires to the plurality of luminaires via the radio communication circuit.

2. The wireless communication device according to claim 1,
   wherein the signal relating to the communication setting is a signal for setting a code to the plurality of luminaires, so that the plurality of luminaires are operated based on a radio signal.

3. The wireless communication device according to claim 1,
   wherein the signal relating to the communication setting is a signal for setting a communication frequency for communication between the radio communication circuit and the plurality of luminaires.

4. The wireless communication device according to claim 1,
   wherein the operation signal is a dimming control signal for dimming the plurality of luminaires, and
   the signal having the predetermined pattern is a signal having a pattern different from a pattern of the dimming control signal.

5. A lighting system, comprising:
   a plurality of luminaires;
   a management device which controls operations of the plurality of luminaires;
   a plurality of wireless communication circuits which transmit an operation signal for controlling the plurality of luminaires transmitted from the management device to the plurality of luminaires by performing radio communication; and
   a remote controller which transmits an infrared signal to the plurality of wireless communication circuits,
   wherein each of the plurality of wireless communication circuits includes:

a wired communication circuit which receives, through a wired connection, the operation signal from the management device;

a radio communication circuit which converts the operation signal received by the wired communication circuit and transmits the converted operation signal to the plurality of luminaires over a radio wave;

an infrared ray receiver which receives the infrared ray signal transmitted from the remote controller; and a controller which controls the wired communication circuit, the radio communication circuit, and the infrared ray receiver, and wherein when the wired communication circuit receives a signal having a predetermined pattern from the management device, the controller of each of the plurality of wireless communication circuits transitions to a state for receiving the infrared ray signal of the remote controller, and, based on the infrared ray signal transmitted from the remote controller, transmits a signal relating to communication setting between the radio communication circuit and the plurality of luminaires to the plurality of luminaires via the radio communication circuit.

6. The lighting system according to claim 5, wherein a luminaire included in the plurality of luminaires and subjected to a predetermined operation receives a signal relating to the communication setting, and is set based on the communication setting.

* * * * *